United States Patent
Bugbee

(10) Patent No.: US 7,707,423 B2
(45) Date of Patent: Apr. 27, 2010

(54) METHOD AND SYSTEM FOR MAINTAINING DIGITAL SIGNATURE INTEGRITY

(75) Inventor: Larry Bugbee, Kent, WA (US)

(73) Assignee: The Boeing Company, Chicago, IL (US)

(*) Notice: Subject to any disclaimer, the term of this patent is extended or adjusted under 35 U.S.C. 154(b) by 1288 days.

(21) Appl. No.: 11/205,906

(22) Filed: Aug. 17, 2005

(65) Prior Publication Data

US 2007/0043948 A1 Feb. 22, 2007

(51) Int. Cl.
*H04L 9/00* (2006.01)
(52) U.S. Cl. .................... 713/176; 713/168; 713/150
(58) Field of Classification Search .................. 713/176, 713/168, 150
See application file for complete search history.

(56) References Cited

OTHER PUBLICATIONS

Larry Bugbee (same name as the inventor of this application), email from LarryBugbee@PSS.Boeing.com to IETF, Jun. 16, 1999.*
Kirsty Needham, Sydney Morning Herald Online, Online bankers face double layer of security, Mar. 9, 2005.*
http://en.wikipedia.org/wiki/Password_strength, printed out in year 2009.*
http://www.aikosolutions.com/encryption/encryption-and-password-strength, printed out in 2009.*
American Bar Association Section of Science and Technology Information Security Committee, Digital Signature Guidelines—Tutorial, , Publisher: Digital Signature Guidelines Press Release, Pulished in: Internet [http://www.abanet.org/scitech/ec/isc/dsg-tutorial.html].
Digital Signatures, Jan. 7, 2003, Publisher: Oasis, Published in: Internet [http://xml.coverpages.org/digitalSignature.html].
Digital Signature, Aug. 9, 2005, Publisher: Wikipedia, Published in: Internet [http://en.wikipedia.org/wiki/Digital_signature].
Ed Simon et al., An Introduction to XML Digital Signatures, Aug. 8, 2001, Publisher: O'Reilly xml.com, Published in: Internet [http://www/xml.com/pub/a/2001/08/08/xmldsig.html].
Rich Salz, Understanding XML Digital Signature, Jul. 2003, Publisher: MSDN, Publisher in: Internet.
XML Digital Signature, Jul. 12, 2005, Publisher: Oasis, Published in: Internet [http://xml.coverpages.org/xmlSig.html].
Joe Rudich, PKI: A Primer Get the Basics on This Reliable and Commonly-Used Encryption Technology, Dec. 2000, Publisher: Network Administrator, St. Paul Companies, Published in : Internet [http://www-106.ibm.com/developerworks/library/s-pki.html].
The Legion of the Bouncy Castle, DEV-CRYPTO Mail Archive, Published in: Internet [http://www.bouncycastle.org/devmailarchive/msg04254.html].
HMAC, The Keyed Hash-Based Mac Function, Published in: Internet [http://www.acm.jhu.edu/~upe/member_sites/zarfoss/HMAC.html].

* cited by examiner

*Primary Examiner*—David Y Jung
(74) *Attorney, Agent, or Firm*—Yee & Associates, P.C.; Baldwin D. Quan

(57) ABSTRACT

Method and system for maintaining digital signature integrity is provided. The method includes, creating a first electronic signature using a first set of hashing and signing algorithm; creating a second electronic signature using a second set of hashing and signing algorithms different than the first set of hashing and signing algorithms; and storing the document with the first and second electronic signatures.

20 Claims, 5 Drawing Sheets

METHOD AND SYSTEM FOR MAINTAINING DIGITAL SIGNATURE INTEGRITY

BACKGROUND OF THE INVENTION

1. Field of the Invention

The present invention relates to digital signatures, and more particularly, to a method and system for maintaining the integrity of an electronic document signed with digital signatures.

2. Background

Electronic documents (interchangeably referred to as "content" or "document" throughout this specification) are commonly stored, transferred, shared and viewed. Examples include e-mails, spreadsheets, text files, XML files, videos, music, executable programs, selected content within a document, and numerous other forms of digital data or content.

Encryption and digital signatures are used in the electronic world to secure electronic documents. A digital signature (interchangeably referred to as "signature" throughout this specification) can provide assurance that an electronic document is authentic. Authentic in this sense means that one knows who signed the document and that the document has not been altered since it was signed.

As is the usual practice in public key cryptography, a key pair is composed of a private key and a corresponding public key. They work only with each other, that is, something signed with one private key cannot be verified with any other key except the public key of the same key pair. Users (signers) are to keep their private signing keys secret.

The public key, on the other hand, can be made very public, but it is important to know which public key belongs to whom. This is solved by creating and publishing, or otherwise making available, public key certificates digitally signed by a Certificate Authority (CA). The certificates, or "certs", are a specialized document that binds a public key to the identity of its owner and commonly have an expiration date of two years hence. All this is common practice in most Public Key Infrastructures (PKI) and forms the basis of knowing the identity of the signer.

Just as users protect their private signing keys, users should also securely receive and store, by trusted processes, the public key certificates of the CAs they trust so they can rely on the results of the digital signature verification process.

Signing a document involves passing the document or data to be signed through a hashing algorithm to create a hash, also known as a message digest. This hash is a string of bits, sometimes viewed as a number, which represents the document. The hash is constructed in such a way that any change to the document results in a different hash value. Further, the hash algorithm is cryptographically strong, that is, the hash is a calculated in such a way that it is computationally infeasible to find a second change, perhaps indiscernible to a human reader, which would yield the same hash value. This gives high assurance that if the hash remains the same, the document remains unaltered.

The hash, along with the signer's private key, is then fed to another algorithm to produce a signature (another string of bits). The signature, along with some descriptive information, is frequently appended to the document, and should remain with the document for later verification. Digital signatures are flexible. A single signature can cover, or apply to, all combinations of single or multiple documents in their entirety, and/or single or multiple portions of documents.

Another variation makes use of transitive properties where one signature can sign other hashes and/or other signatures, depending on one's objective. For example, it is not uncommon to see a hash of a document be itself the target of a signature (where the first hash is itself hashed to create a second hash which is then provided to the signing algorithm). Signing a hash of a document can, under the right conditions, provide the same integrity protection as signing the document directly. Again, under the right conditions, a similar result can be obtained by signing another signature.

Verifying the signed document to determine its authenticity involves calculating a fresh hash of the document in question. This new hash, the signature, and the signer's public key are then provided to another algorithm which will identify whether the document is or is not authentic. The verification process continues with several steps to assure the public key certificate, from which the signer's public key was extracted, is also authentic. There are other technical attributes and functions such as ensuring the signer's key wasn't revoked and posted on a Certificate Revocation List (CRL).

Various standard techniques exist for digital signatures. For example, the Digital Signature Standard (DSS) is based on a type of public key encryption method that uses the Digital Signature Algorithm (DSA). The DSS is a format for digital signatures that has been endorsed by the United States government. The DSA algorithm uses public and private keys, the internals of which are specific to that algorithm. Different algorithms typically require key pairs with different internals.

All this and more are well defined, common practices of public key cryptography and Public Key Infrastructures. They are not described in further detail here but are important foundations upon which this invention depends.

Faster computers and advances in cryptanalysis are the primary reasons algorithms used for digital signatures tend to become weak over time. Conventional digital signature schemes do not provide any assurance that over an extended period of time, a digital signature will continue to provide integrity.

There is, therefore, a need for a method and system that maintains the integrity of digital signatures/signed electronic documents.

SUMMARY OF THE PRESENT INVENTION

In one aspect of the present invention, a method for maintaining electronic signature integrity is provided. The method includes, creating a first electronic signature using a first set of hashing and signing algorithm; creating a second electronic signature using a second set of hashing and signing algorithms different than the first set of hashing and signing algorithms; and storing the document with the first and second electronic signatures.

In another aspect of the present invention, a system for maintaining electronic signature integrity is provided. The system includes a processor that facilitates creating a first electronic signature using a first set of hashing and signing algorithm; creating a second electronic signature using a second set of hashing and signing algorithms different than the first set of hashing and signing algorithms; and storing the document with the first and second electronic signatures.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

In one aspect of the present invention, a method and system for maintaining digital signature integrity is provided. The method includes, using a first digital signature and supporting public key certificates constructed using hashing and signing algorithm pairs from a first set of algorithms; using another digital signature and supporting public key certificates constructed using hashing and signing algorithm pairs from a second set of algorithms mutually exclusive of the first set of hashing and signing algorithms; and storing the document with the first digital signature and the second digital signature.

Should an algorithm used by either digital signature or its supporting certificate chain be declared weak or broken, the other digital signature and its supporting certificate chain should be able to protect the document allowing time for replacement signatures restoring integrity to double signature strength.

To facilitate an understanding of the preferred embodiment, the general architecture and operation of the signing process will be described. The specific architecture and operation of the preferred embodiments will then be described with reference to the general architecture.

Signing Application

Figure 1A:
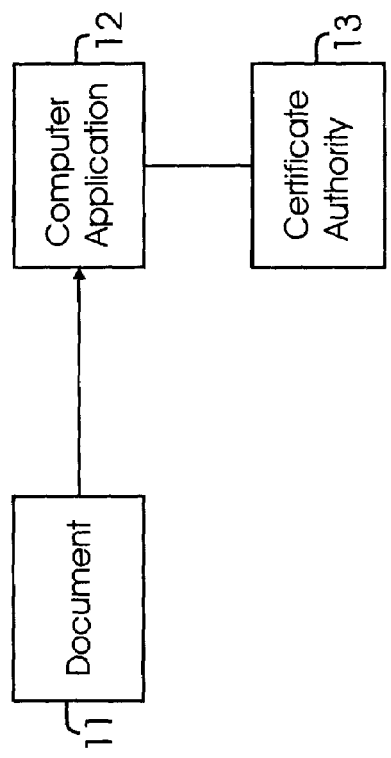
FIG. 1A is a block diagram of a computer application signing a document, according to one aspect of the present invention.

FIG. 1A shows a highly simplified block diagram for signing an electronic document 11 using a computer application 12 running on a computing system. Application 12 may have the embedded ability to allow a user to sign the documents or can access another applications or modules that allow a user to sign document 11. The signer can be a person using the person's signing key or the signer may be an application using the signing key assigned to the application.

Digital certificates are often used to verify electronic documents. A digital certificate, sometimes referred to as a public key certificate, is a binding of the signer's identity information with the signer's public key digitally signed by an independent and mutually trusted Certificate Authority 13 (CA). A digital certificate allows one to extract its public key and have confidence it is the public key of the entity named in the digital certificate. It is noteworthy that the present invention is not limited to any particular type or number of CA authorities. Note too that the named entity can be a person, an organization, an application, a hardware device, or any other entity whose identity is bound to its public key with a properly issued certificate by CA 13.

Figure 1B:
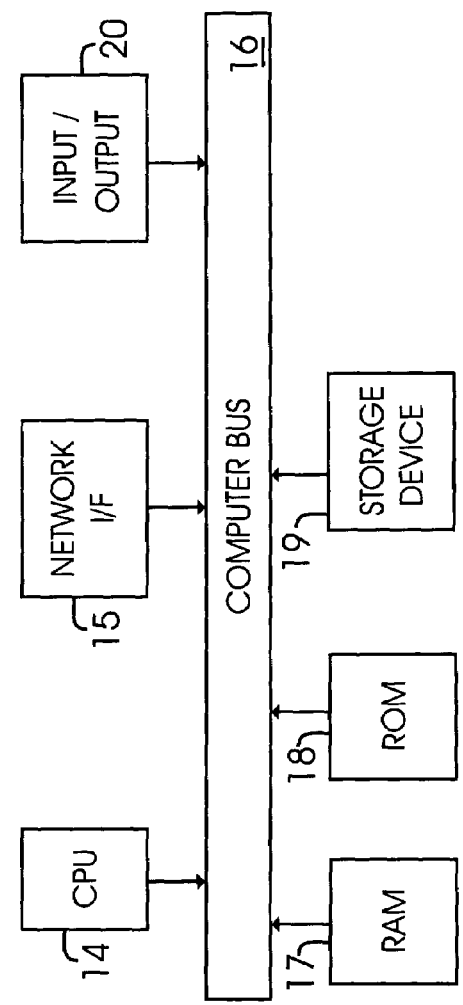
FIG. 1B is an abstracted version of a computer system used, according to one aspect of the present invention.

FIG. 1B shows an abstracted view of a computing system used for executing the adaptive aspects of the present invention. The computing system includes a central processing unit ("CPU") 14 for executing computer-executable process steps and interfaces with a computer bus 16. Also shown in FIG. 1B is a network interface 23 that provides network connectivity to the computing system.

Input/output block 20 is intended to represent plural input devices, such as a mouse and keyboard that allow a user to interact with the computer system and one or more output devices, for example, a monitor and printer and others.

Storage device (or mass storage system) 19 is provided and stores operating system program files, application program files (for example, computer application 12), web browsers, and other files. Some of these files are stored using an installation program. For example, CPU 14 executes computer-executable process steps of an installation program so that CPU 14 can properly execute the application program.

Random access memory ("RAM") 17 also interfaces to computer bus 16 to provide CPU 14 with access to memory storage. When executing stored computer-executable process steps from storage device 19 (or any other storage media), CPU 14 stores and executes the process steps out of RAM 17.

Read only memory ("ROM") 18 is provided to store invariant instruction sequences such as start-up instruction sequences or basic input/output operating system (BIOS).

It is noteworthy that the present invention is not limited to the FIG. 1B architecture. For example, notebook or laptop computers, handheld devices, set-top boxes or any other system capable of running computer-executable process steps, as described below, may be used to implement the various aspects of the present invention.

Process Flow

In one aspect of the present invention, a method and system is provided that allows a user to sign an electronic document more than once using two or more separate and mutually exclusive sets of hashing and signing algorithms. Each signature and all of its supporting digital certificates are to be constructed using algorithms from a set of algorithms not having common elements with sets of algorithms used by the other document signatures (and all of their supporting digital certificates). The signed document remains protected by a second signature should one or more of the algorithms from a set be declared weak or broken, and a new signature could be added to replace the questionable signature to restore the document to double signature strength.

Figure 2:
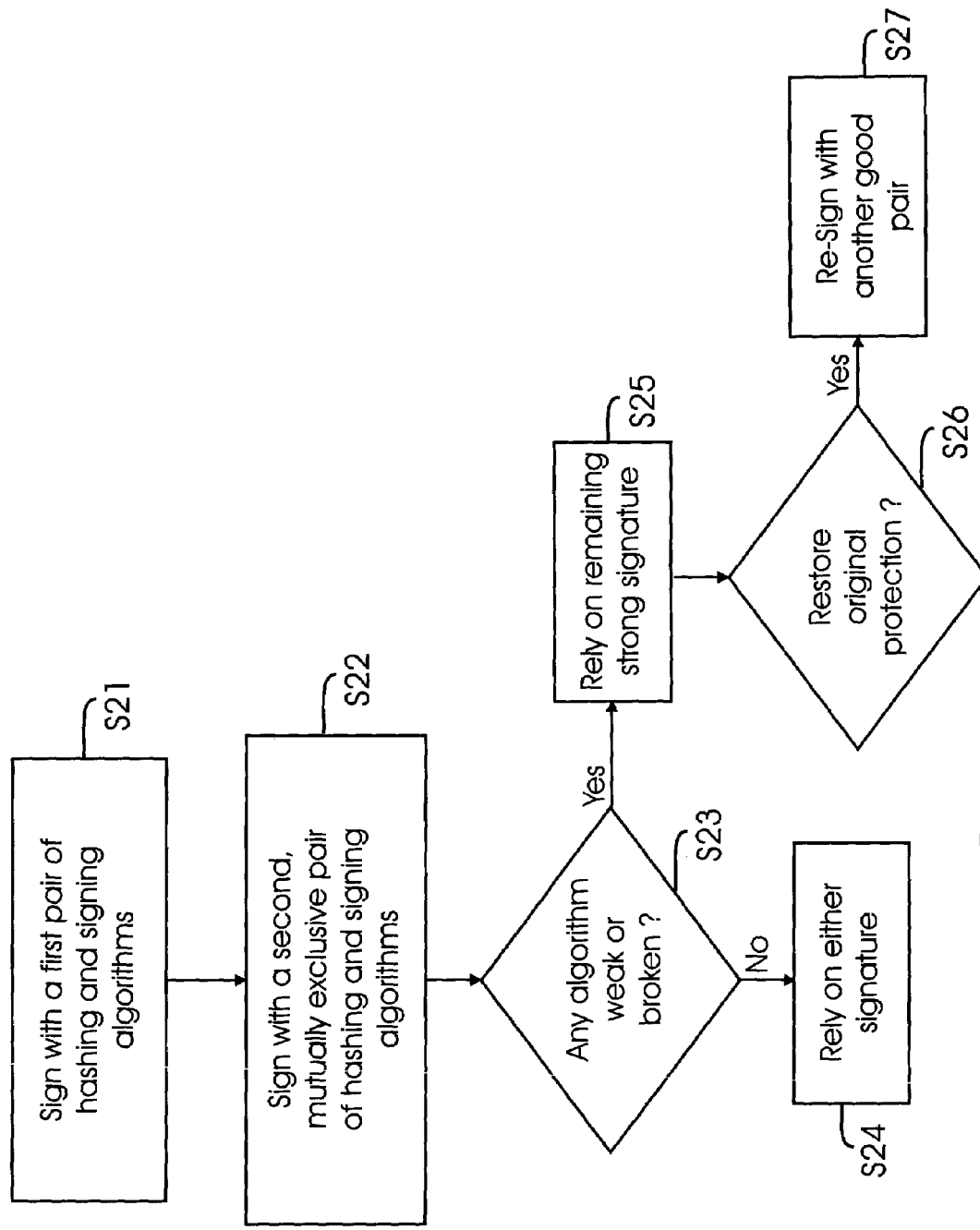
FIG. 2 shows a process flow diagram for signing a document, according to one aspect of the present invention.

FIG. 2 shows a process flow diagram of the adaptive aspects of the present invention where a document is signed more than once using algorithms from separate and mutually exclusive sets of hashing and signing algorithms.

Turning in detail to step S21 of FIG. 2, a user signs a document using a hash algorithm and a signing algorithm (a pair) from the first set of hashing and signing algorithms associated with CA 13 (FIG. 1).

In step S22 the user signs the document again but uses another algorithm pair from a second set of hashing and signing algorithms, elements of which are mutually exclusive to the elements of the first set used in S21. The signed document is stored in a mass storage system.

The algorithms are continuously monitored in step S23 and so as long as all algorithms used in both signatures and their supporting digital certificates remain strong (not weak or broken), parties may rely on either the first or the second signature S24. If, on the other hand, an algorithm becomes weak or broken, then S25 relies on the signature not dependent on the weak or broken algorithm.

In step S26, should there be a desire to restore the document to "double signature strength", the document may be re-signed in step S27, using another pair of strong algorithms, otherwise the process ends.

Double Signature Strength

Figure 3:
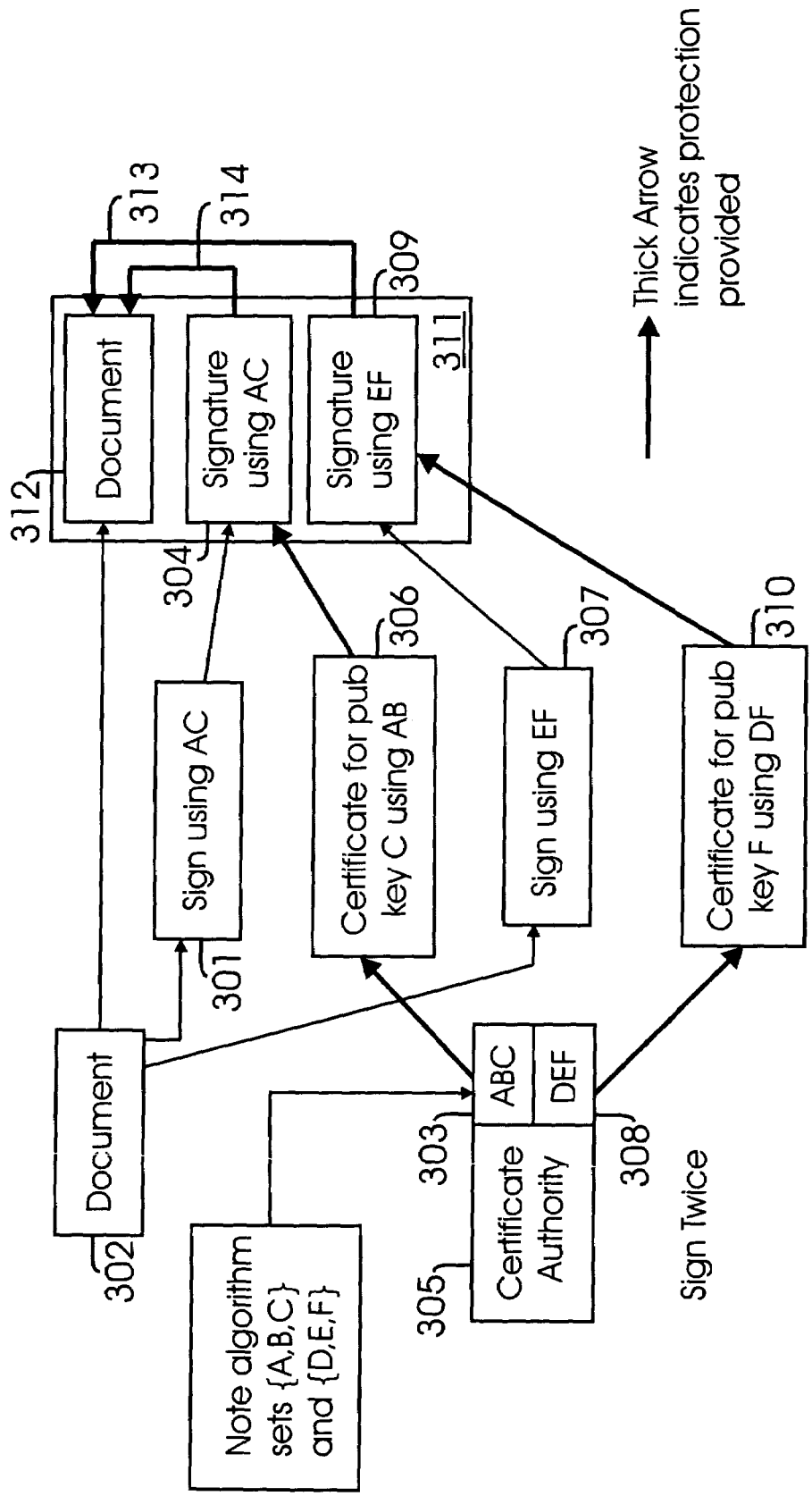
FIG. 3 shows the integrity protection provided by the two signatures applied by the process flow of FIG. 2.

FIG. 3 illustrates two signatures and their supporting digital certificates providing integrity protection to the same document.

In item 301 of FIG. 3 (which is the same as step S21 in FIG. 2), a user signs document 302 using hash algorithm A and signing algorithm C (shown as the pair AC in 301) from the first set of hashing and signing algorithms {A,B,C} in algorithm set 303 to create signature 304.

Note that while the signer used algorithm pair AC in 301, the signer's digital certificate 306 was signed by Certificate Authority 305 using hashing algorithm A and signing algorithm B, the algorithm pair AB. This is acceptable. Signature 304 and certificate 306 should be based on algorithms from the algorithm set 303. Other hashing algorithm and signing algorithm pairs from the same set 303 could be used.

Note that the algorithm set {A,B,C} 303 is illustrated as being associated with Certificate Authority 306 (CA), but that is not a necessity. The elements of the sets are identified and any reasonable means to keep the use of the sets orderly is within the adaptive aspects of the present invention.

In 307 (which is the same as step S22 in FIG. 2), a user signs document 302 again this time using a second algorithm pair EF from a second set of hashing and signing algorithms 308 to create signature 309. Note that the elements of set 308 are mutually exclusive of the elements of set 303.

Also note that the signer's digital certificate 310 is signed using hashing algorithm D and signing algorithm F (pair DF) as illustrated in 310. Likewise, this too is acceptable so long as the algorithms are valid algorithm pairs from set 308.

After signings, 301 and 307, the document 302, or a copy, is associated with or placed in container, envelope, wrapper, or other association 311 as document 312 along with both signatures, 304 and 309. Line 313 shows signature 309 protecting the document. Likewise, line 314 shows signature 304 protecting the same document.

Assurances of Integrity when C Weak or Broken

Figure 4:
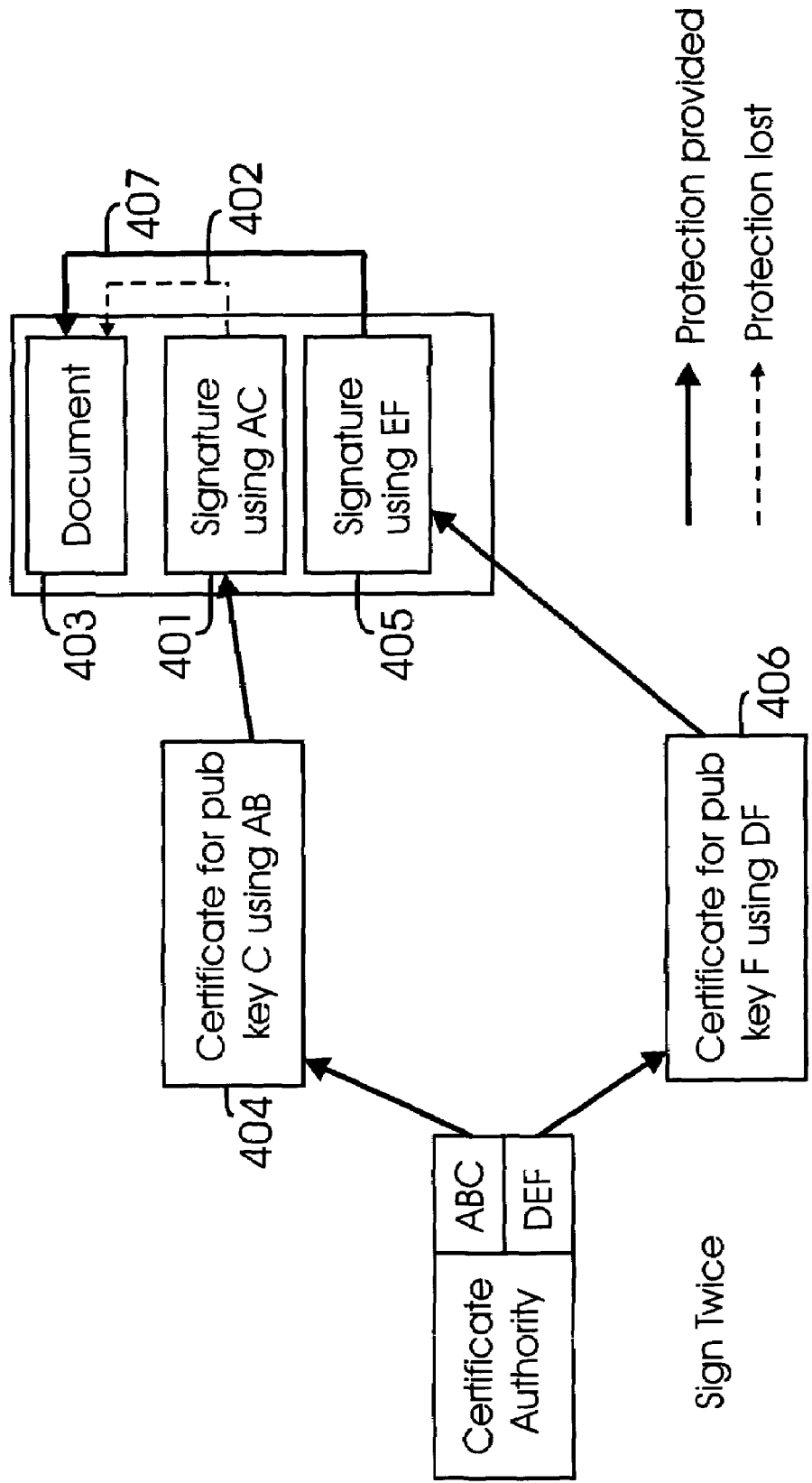
FIG. 4 illustrates the integrity protection remaining should one algorithm of FIG. 3 be considered weak or broken.

FIG. 4 illustrates the situation where one algorithm, algorithm C, is declared weak or broken and all signatures and certificates based on algorithm C are therefore suspect and cannot be fully trusted.

Turning to FIG. 4, the only use of the weak or broken algorithm C is in signature 401. Dotted line 402 illustrates signature 401 no longer providing reliable, integrity protection to document 403.

Certificate 404 is still good because it is signed by pair AB, but because it certifies the association of the signer's identity with a public key for algorithm C, certificate 404 has limited value. (Certificate 404 becomes a candidate for revocation.)

Signature 405 and its supporting certificate 406 are still considered good and line 407 illustrates continuing integrity protection for document 403.

Re-sign to Restore Double Signature Strength

Figure 5:
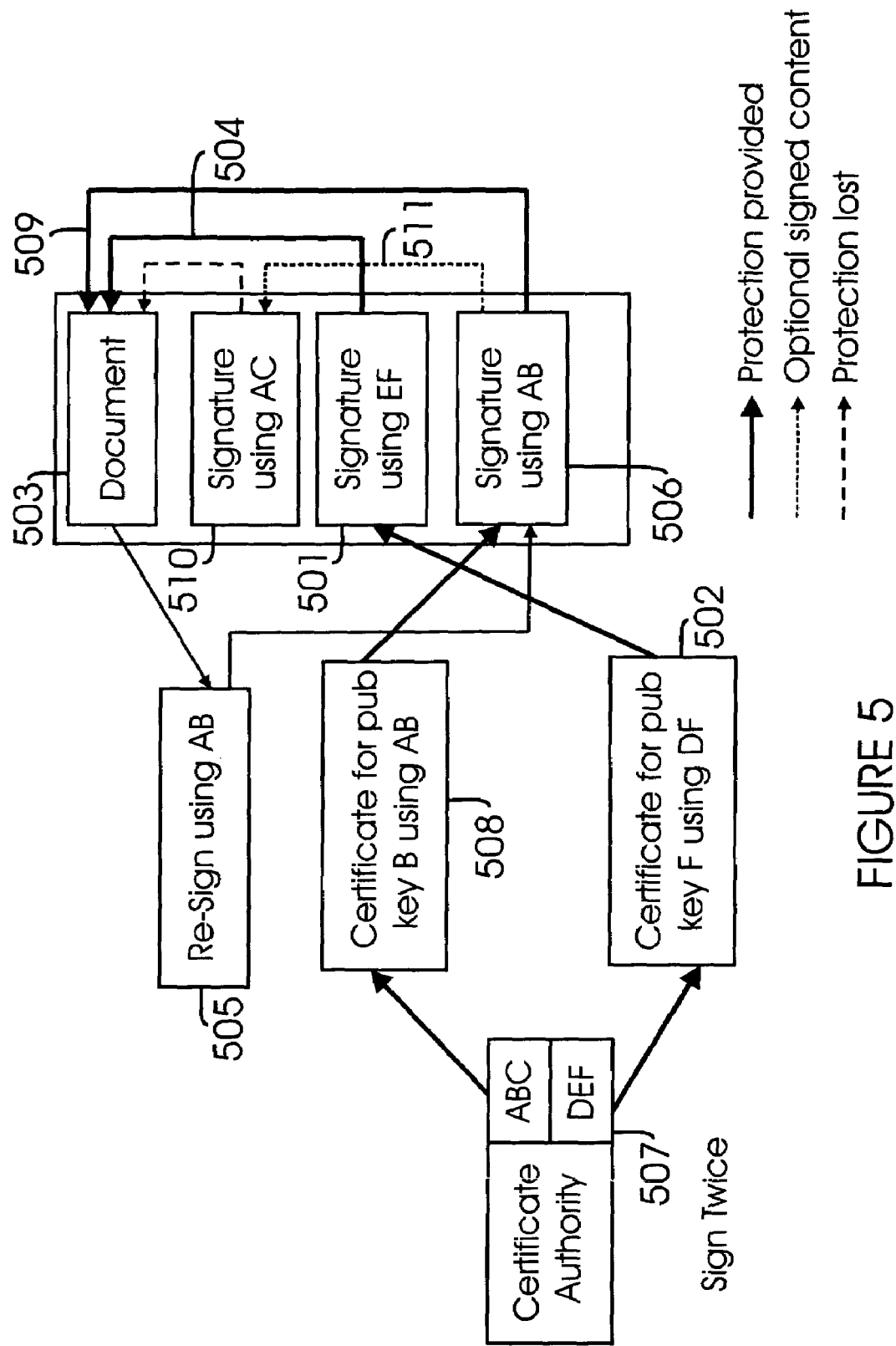
FIG. 5 illustrates how a re-signing can restore the integrity protection lost due to a weak or broken algorithm.

FIG. 5 illustrates how re-signing can restore integrity protection to double signature strength. Re-signing is optional but may be appropriate for those documents (or other signed content) needing high assurances of integrity.

Signature 501 in FIG. 5 is supported by certificate 502 and still provides integrity protection to document 503 as illustrated by line 504.

The re-signing 505, which is the same as step S27 in FIG. 2, is the re-signing of document 503 using another algorithm pair, this time AB, to create signature 506. Signature 506 is created using algorithm pair AB which are not members of the set of algorithms 507. (Algorithm set 507 is used by signature 501 and certificate 502.) The new signature 506 is supported by another certificate 508. Signature 506 provides integrity protection to document 503 as illustrated with line 509.

Sometimes it may be improper to "remove" the questionable signature 510, so optionally, signature 506 can include, as part of its signed content, the questionable signature 510 as illustrated by line 511. Signature 506 cannot restore signature 510's lost protection, but signature 506 can, by signing signature 510, provide some measure of intent and/or audit trail.

Thus, document 503 is again protected with two signatures, 501 and 506, as illustrated with lines 504 and 509.

It is noteworthy that although the foregoing illustrations are based on two digital signatures, the present invention is not limited to any particular number of signatures, or any type of algorithm, digital signature format, number of certificates, or the number of certificate authorities, as long as the number of signatures is more than one and they are based on different algorithm sets. For example, the present invention can also provide. additional integrity protection for signatures using algorithms based symmetric (secret) key cryptography.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. method for maintaining electronic signature integrity, comprising:
    creating a computer generated first electronic signature for an electronic document using a first set of hashing and signing algorithms;
    creating a computer generated second electronic signature for the electronic document using a second set of hashing and signing algorithms different than the first set of hashing and signing algorithms;
    storing the electronic document in a computer storage, with the first and second electronic signatures;
    monitoring strength of the first set and the second set of hashing and signing algorithms to declare the first electronic signature or the second electronic signature as weak;
    replacing the first electronic signature by using another set of hashing and signing algorithms mutually exclusive from the second set of hashing nd signing algorithms, if the first electronic signature is declared weak; and
    replacing the second electronic signature by using another set of hashing and signing algorithms mutually exclusive from the first set of hashing and signing algorithms, if the second electronic signature is declared weak.

2. The method of claim 1, wherein the step of creating a first electronic signature further comprises using a first private key and the step of creating the second electronic signature further comprises using a second private key.

3. The method of claim 1, wherein each one of the first and second hashing algorithms having a plurality of elements.

4. The method of claim 3, wherein the plurality of elements of the first hashing algorithm being mutually exclusive from the plurality of the elements of the second hashing algorithm.

5. The method of claim 1, wherein each one of the first and second electronic signatures individually protecting the document.

6. The method of claim 5, wherein if any one of the signing or hashing algorithms in the first electronic signature is declared weak, the second electronic signature protects the document.

7. The method of claim 5, wherein if any one of the signing or hashing algorithms in the second electronic signature is declared weak, the first electronic signature protects the document.

8. The method of claim 1, wherein the document with the first and second electronic signatures is stored in a mass storage system.

9. A method for maintaining electronic signature integrity, comprising:
   creating a computer generated first electronic signature for an electronic document using a first set of hashing and signing algorithms;
   creating a computer generated second electronic signature for the electronic document using a second set of hashing and signing algorithms different than the first set of hashing and signing algorithms:
   storing the electronic document in a computer storage with the first and second electronic signatures; and
   replacing the first electronic signature by using a third set of hashing and signing algorithms mutually exclusive from the second set of signing and hashing algorithms, if the first electronic signature is declared weak.

10. The method of claim 9, wherein the first electronic signature is declared weak when the first signing algorithm is declared week.

11. The method of claim 9, wherein the first electronic signature is declared weak when the first hashing algorithm is declared week.

12. A method for maintaining electronic signature integrity, comprising:
   creating a computer generated first electronic signature for an electronic document using a first set of hashing and signing algorithms;
   creating a computer generated second electronic signature for the electronic document using a second set of hashing and signing algorithms different than the first set of hashing and signing algorithms;
   storing the electronic document in a computer storage with the first and second electronic signatures; and
   replacing the second electronic signature by using a third set of hashing and signing algorithms mutually exclusive from the second set of signing and hashing algorithms, if the first electronic signature is declared weak.

13. The method of claim 12, wherein the second electronic signature is declared weak when the second signing algorithm is declared week.

14. The method of claim 12, wherein the second electronic signature is declared weak when the second hashing algorithm is declared week.

15. A system for maintaining electronic signature integrity, comprising:
   a processor configured to
      create a first electronic signature for an electronic document, using a first set of hashing and signing algorithm;
      create a second electronic signature for the electronic document, using a second set of hashing and signing algorithms different than the first set of hashing and signing algorithms; store the document in a computer storage, with the first and second electronic signatures;
      monitor strength of the first set and the second set of hashing and signing algorithms to declare the first electronic signature or the second electronic signature as weak;
      replace the first electronic signature by t using another set of hashing and signing algorithms mutually exclusive from the second set of hashing and signing algorithms, if the first electronic signature is declared weak; and
      replace the second electronic signature by using another set of hashing and signing algorithms mutually exclusive from the first set of hashing and signing algorithms, if the second electronic signature is declared weak.

16. The system of claim 15, wherein each one of the first and second hashing algorithms having a plurality of elements.

17. The system of claim 16, wherein the plurality of elements of the first hashing algorithm being mutually exclusive from the plurality of the elements of the second hashing algorithm.

18. The system of claim 15, wherein each one of the first and second electronic signatures individually protecting the document.

19. The system of claim 18, wherein if any one of the signing or hashing algorithms in the first electronic signature is declared weak, the second electronic signature protects the document.

20. The system of claim 17, the first electronic signature is replaced by using a third set of hashing and signing algorithms mutually exclusive from the second set of signing and hashing algorithms, if the first electronic signature is declared weak.

* * * * *